US010878025B1

(12) United States Patent
Gualtieri et al.

(10) Patent No.: US 10,878,025 B1
(45) Date of Patent: Dec. 29, 2020

(54) FIELD OF VIEW NAVIGATION TRACKING

(71) Applicant: Omnyx, LLC, Pittsburgh, PA (US)

(72) Inventors: James Gualtieri, Pittsburgh, PA (US); John Carpenter, Pittsburgh, PA (US); Vikas Shivaprabhu, Pittsburgh, PA (US); Ronald A. Stone, Pittsburgh, PA (US)

(73) Assignee: Omnyx, LLC, Pittsburgh, PA (US)

( * ) Notice: Subject to any disclaimer, the term of this patent is extended or adjusted under 35 U.S.C. 154(b) by 138 days.

(21) Appl. No.: 15/702,703

(22) Filed: Sep. 12, 2017

Related U.S. Application Data

(60) Provisional application No. 62/393,525, filed on Sep. 12, 2016.

(51) Int. Cl.
| | | |
|---|---|---|
| *G06F 16/583* | (2019.01) | |
| *G06T 11/00* | (2006.01) | |
| *G06T 7/00* | (2017.01) | |
| *G06T 11/40* | (2006.01) | |
| *G06F 16/58* | (2019.01) | |

(52) U.S. Cl.
CPC ...... *G06F 16/5838* (2019.01); *G06F 16/5866* (2019.01); *G06T 7/0012* (2013.01); *G06T 11/001* (2013.01); *G06T 11/40* (2013.01); *G06T 2207/30004* (2013.01)

(58) Field of Classification Search
CPC ............ G06F 16/5846; G06F 16/5854; G06F 16/5862; G06F 16/5866; G06T 7/0012; G06T 11/001; G06T 11/40; G06T 2207/30004
See application file for complete search history.

(56) References Cited

U.S. PATENT DOCUMENTS

| | | | |
|---|---|---|---|
| 4,672,559 A | 6/1987 | Jansson et al. | |
| 6,313,452 B1 | 11/2001 | Paragano et al. | |
| 2004/0184678 A1* | 9/2004 | Maddison | G02B 21/002 382/291 |
| 2012/0069049 A1 | 3/2012 | Howe et al. | |
| 2012/0072452 A1* | 3/2012 | Stratman | G16H 10/40 707/772 |
| 2014/0160264 A1 | 6/2014 | Taylor et al. | |
| 2017/0316359 A1* | 11/2017 | Amin | G06Q 10/02 |

* cited by examiner

*Primary Examiner* — Brenda C Bernardi
(74) *Attorney, Agent, or Firm* — Babst Calland; Carl A. Ronald

(57) ABSTRACT

A digital pathology system for recording and displaying field of view portions that have been viewed in the context of developing a diagnosis for a pathology case. A whole slide image is presented with shading overlaid on the image illustrating those portions that have been viewed. Portions of the WSI that have received the pathologist's attention at different magnifications are marked with distinguishing hatching.

20 Claims, 4 Drawing Sheets

FIELD OF VIEW NAVIGATION TRACKING

CROSS-REFERENCE TO RELATED APPLICATIONS

This application claims the benefit of U.S. Provisional Patent Application No. 62/393,525, filed Sep. 12, 2016.

FIELD OF INVENTION

The present invention relates to the field of digital pathology, and more specifically, improvements to digital pathology systems involving tracking and recording fields of view of a specimen that have been examined.

BACKGROUND OF INVENTION

Pathology involves the study and diagnosis of disease through the examination of specimens obtained from a patient with a medical concern. Conventional specimen examination procedures involve viewing glass specimen slides through an optical microscope. Advances in existing technology have produced digital image-based pathology slides wherein traditional glass slides are replaced by digital specimen images. In general, digital specimen images are obtained by scanning glass slides with a digital scanner at various magnifications. After being created, the digital specimen images are typically stored in a centralized database and may be accessed through a computing device interface in communication with the database.

Access to digital specimen images has profoundly affected the field of pathology because it relieves the pathologist from certain tasks associated with physical handling of glass slides and manual manipulation of optical instruments. In addition, the use of digital specimen images allows for automated processes for presenting, manipulating, and performing calculations on images. Additionally, the use of digital specimen images has created the opportunity to monitor and record the examination process that a pathologist uses while examining the digital specimen images. Typically, this capability is valuable for both training and quality assurance purposes.

Pathologists may interact with digital specimen images at a computer workstation operating within a digital pathology system (DPS). The workstation may be configured to utilize one or more processors and software routines to present selected images on a display device and provide image manipulation controlled by input/output devices.

Using data derived from the digital image specimens relieves the pathologist of tasks associated with handling of slides and manual manipulation of optical instruments and it presents increased opportunities to analyze and share the pathologist's examination process. Digital specimen image evaluation also facilitates the collection and storage of image data. In addition, computerized handling enables enhanced sorting and grouping of images with reference to certain information, such as information obtained from patient or specimen databases. Moreover, certain types of cases can undergo pre-processing so that results of an algorithm, for example, can be presented to the pathologist the first time the digital image specimen is viewed.

One area within the DPS where value may be generated is the recordation of the actual process of the pathogist when examining each individual digital image specimen. Collecting such data may allow for sharing with other pathologists for educational purposes, to create and record additional annotations, and to better understand the pathologist's reasoning. As a result, current digital pathology systems can be employed to present new opportunities to better record and understand the pathologist's examination process.

SUMMARY OF INVENTION

This summary is provided to comply with 37 C.F.R. § 1.73, requiring a summary of the invention briefly indicating the nature and substance of the invention. It is submitted with the understanding that it will not be used to interpret or limit the scope or meaning of the claims.

In certain embodiments of the present invention, a digital pathology system records a pathologist's field of view (FOV) trail as he or she navigates about a whole slide image (WSI) in a digital pathology viewer. The system uses the recorded FOV trail to produces two outputs: (a) a semitransparent overlay that indicates which portions of the tissue the pathologist has viewed on their monitor, and (b) a table that indicates the proportion of the tissue that has been viewed at various magnification levels.

The present invention may use the recorded FOV data to provide an illustration of the amount of concentration a pathologist gave to particular areas of a WSI. In certain embodiments, the semitransparent overlay may be represented using differing degrees of transparency or different colors to indicate that certain regions of the WSI were viewed at a greater magnification than others. This, in effect, creates a "heat map" overlaid on the WSI that illustrates where a pathologist has viewed the WSI and at what magnification.

In addition to this graphic representation of the pathologist's FOV navigation tracker, certain embodiments of the system may also produce a table that summarizes the proportion of tissue that has been within the field of view at each magnification level, such as between 5× and 60×. As a result, the inventive system makes novel use of recording the FOV and using that data to providing useful information to the pathologist.

BRIEF DESCRIPTION OF THE DRAWINGS

The accompanying drawings, which are incorporated in and form a part of the specification, illustrate the embodiments of the invention and together with the written description serve to explain the principles, characteristics, and features of the invention. In the drawings.

DETAILED DESCRIPTION OF THE INVENTION

The following detailed description includes the best currently contemplated modes of carrying out exemplary embodiments of the invention. The description is not to be taken in a limiting sense, but is made merely for the purpose of illustrating the general principles of the invention.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Digital Pathology System

Figure 1:
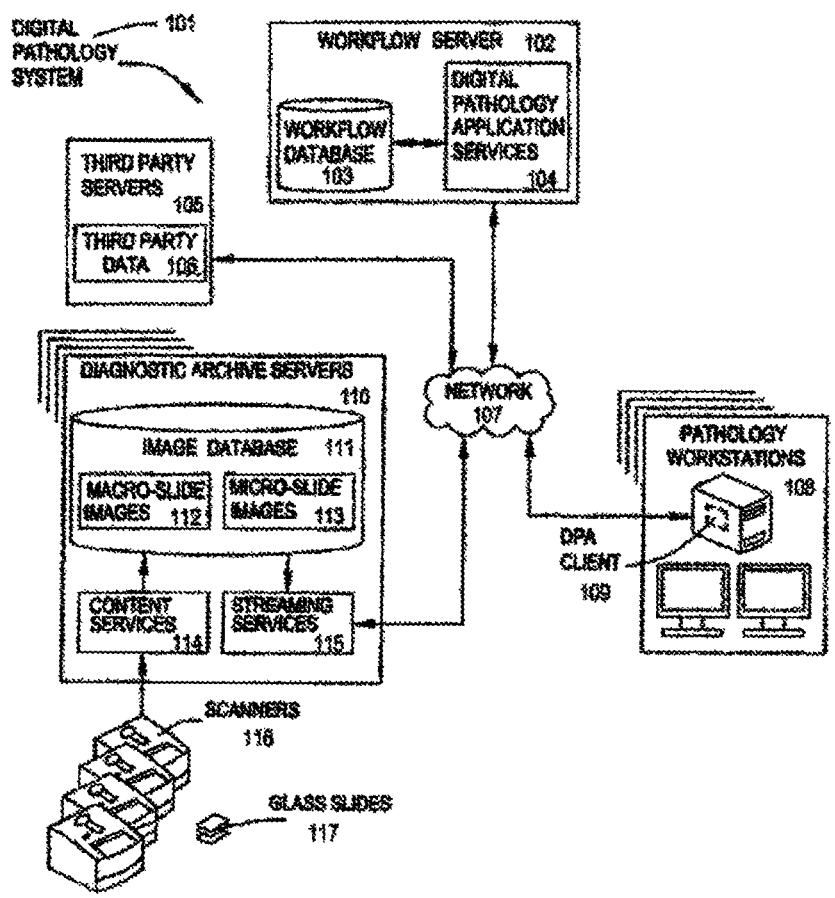
FIG. 1 is an example digital pathology system.

Referring now to FIG. 1, a digital pathology system (DPS) is depicted according to an embodiment of the present invention. In certain embodiments, a digital pathology system 101 comprises a workflow server 102, one or more third party servers 105, one or more diagnostic archive servers 110, and pathology workstations 108, all connected via a network 107.

Digital specimen images may be generated by scanning previously prepared glass slides 117 using specialized scanners 116 capable of transforming glass specimen slides into digital specimen images. These images may be associated with slide and patient identifying information, as well as image identifying information, such as the image capture magnification, and the X, Y, or Z position on the slide. As illustrated in FIG. 1, the digital specimen images may be stored on a diagnostic archive server 110 in an image database 111. The database 111 may store the images along with a set of related fields, including data relating images to each other and the nature of the relationship, successive registered slices of the same sample representing depth or earlier or later stages of a subject disease or of healing.

Third party data 106, such as data available through a general Laboratory Information System (LIS) or a specialized Anatomic Pathology Laboratory Information System (APLIS), may be integrated with the digital specimen images. Referring again to FIG. 1, third party data 106 may be supplied through third party servers 105 operatively connected to the network 107. A workflow server 102 may be provided for hosting application services 104 that support one or more workstations 108 operatively connected through a network 107. The workflow server 102 may also include a workflow database 103 for storing data, including, but not limited to case data and information related to the DPS, such as image catalog information for identifying the image server that is the source of the digital specimen images. One or more application services 104 may be operational on the workflow server 102. According to certain embodiments, application services 104 may include functions directed toward assigning cases, managing case information and access thereto, managing images stored on the diagnostic archive servers 110, providing reporting mechanisms, and facilitating data exchange between network 107 components.

Digital Pathology Workstation

Figure 2:
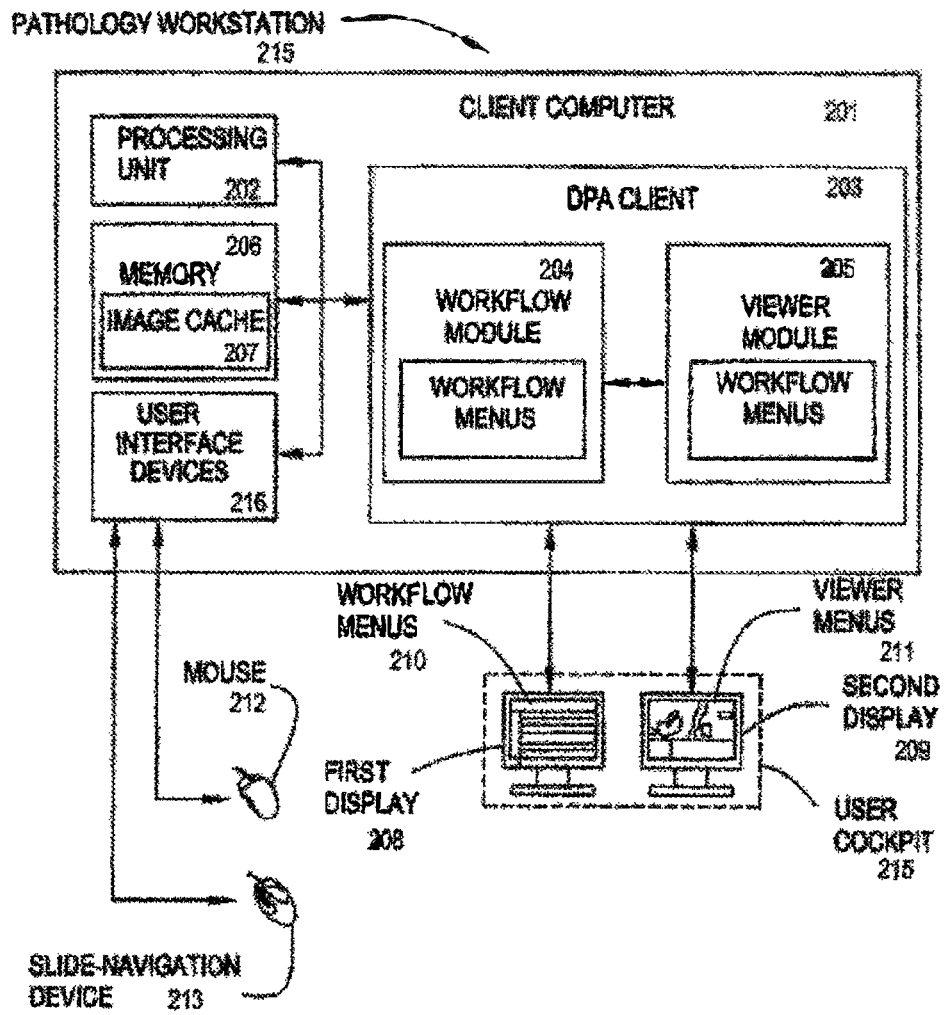
FIG. 2 is an example digital pathology workstation system.

An example pathology workstation configured according to certain embodiments is provided in FIG. 2. The workstation 215 can be comprised of a computing device 201, such as a desktop PC, laptop, server, or other information handling device, running a digital pathology application (DPA) client 203. The computing device 201 may also include a processing unit 202, local memory 206 for storing, for example, an image cache 207, which may be a local image cache of digital pathology system images for a current session. The processing unit 102 and memory 206 may be used for, inter alia, managing the overall operations of the computing device 201. The processing unit 202 may comprise a standard controller or microprocessor device that is capable of executing program instructions loaded from disk or from the network into program memory, such as instructions from the DPA client 203. The memory 206 may be comprised of any available data storage mechanisms capable of storing digital information that is processed locally or provided by data communications with the computing device 201. User interface devices 216 may be in communication with the processing unit 202, such that input/output devices 212, 213 may function to provide user input to the DPA client 203.

The DPA client 203 may be further comprised of a workflow module 204 and viewer module 205, each providing a set of functions and menus. The workflow module 204 may provide mechanisms for managing workflow such as processing cases, organizing cases, grouping cases, creating folders for sharing cases with others, and the like, for example, through a set of workflow menus 210. The viewer module 205 may be arranged for data presentation that simulates aspects of conventional pathology devices and equipment, such as an optical microscope, in a way that emulates the pathologists' operation of navigation tools and case package management practices that were employed with physical slides and microscopes. For this purpose, the viewer module 205 manages and processes information from a set of viewer menus.

Certain embodiments provide for accessing, viewing, and manipulating digital images within a digital pathology environment. According to embodiments, multiple images may be viewed simultaneously in various enhanced configurations and further associated in one or more arrangements facilitating comparison of the multiple images, such as the registration of multiple images. Certain embodiments provide for specifying multiple images in one or more lock groups for group application of image manipulation functions, either with or without image registration. Systems configured according to embodiments may stack images in one or more configurations allowing for navigation through the layers of images.

Digital Image and Field of View Tracking Viewer

Figure 3:
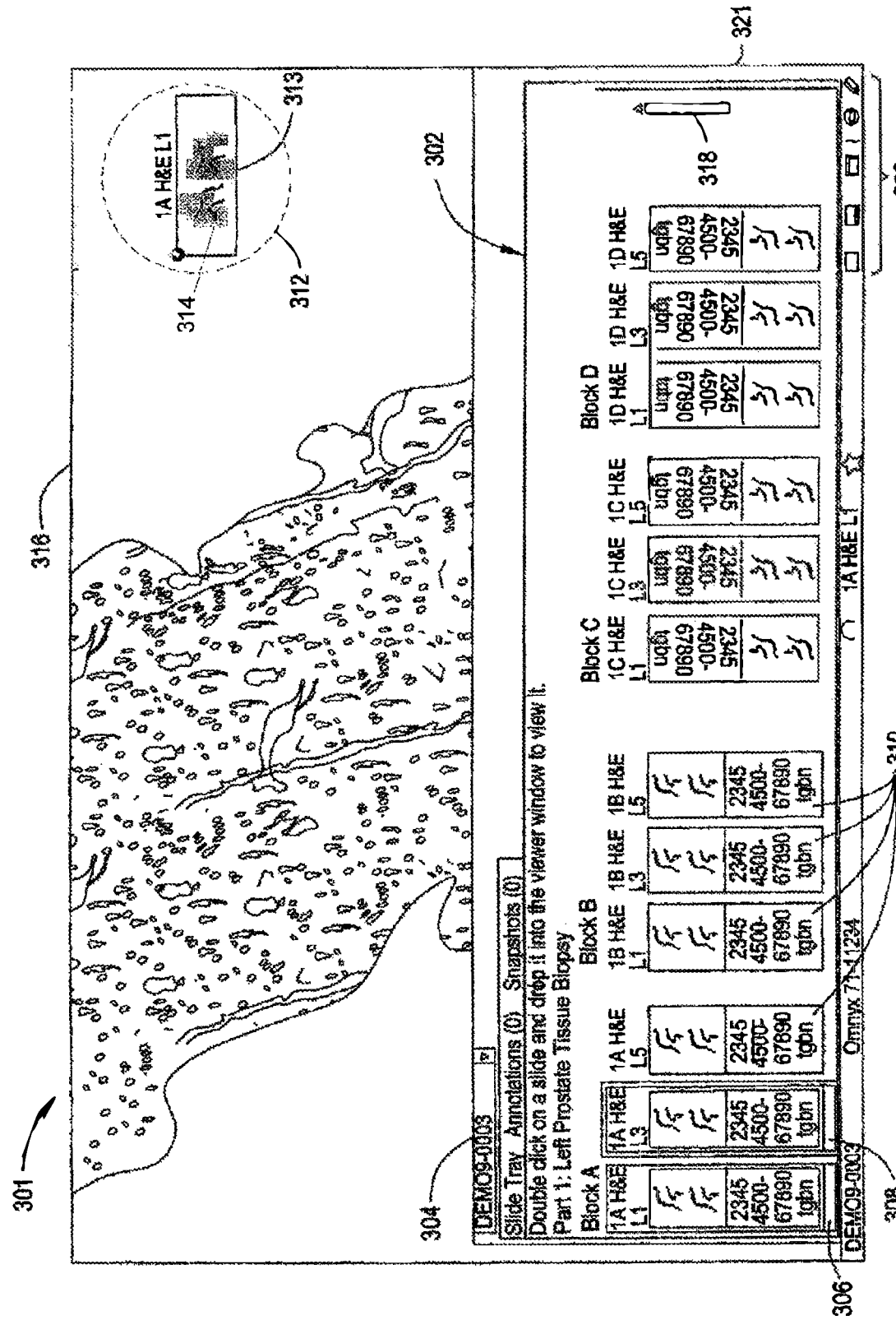
FIG. 3 is an embodiment of an example digital image viewer.

Referring to FIG. 3, there is provided a digital image viewer 301 according to certain embodiments. The viewer 301 may provide users with the ability to view and manipulate both whole and partial slide images. In the example depicted in FIG. 3, a slide tray-level view 302 is active and is configured to provide a familiar visualization to the user, which resembles and/or substantially mimics physical slide trays that are used in physical microscope systems. In certain embodiments, the primary components of viewer 301 include a microscope viewing window 316 and a slide tray viewing window 302. The microscope viewing window 316 may be configured as a viewing window for displaying digital specimen images. The displayed images may correspond to one or more selected WSI's 306 belonging to a selected case 304 and may further represent portions of a WSI at a plurality of different magnifications. When the slides are scanned to make the digital specimen images, each slide may be scanned at a plurality of different magnifications. In embodiments, the magnifications may range from 5× to 60×.

As the pathologist examines the slides of a particular case, they will often only show a small portion of the WSI due to varying magnification levels. According to certain embodiments, the DPS records the slides that were viewed, the proportion and location of the field of view (FOV) for each particular slide relative to the WSI, and the length of time that they were evaluated. Increased time spent on a particular slide can mean it is a region of interest to the pathologist. In other embodiments, the DPS records the use of any measuring tool on any portion of a slide and stores the recorded FOV information in a local or remote database. Because the magnified slides only show a portion of the WSI, it is useful to have an illustration of the areas on the WSI that have been viewed.

In certain embodiments, a field of view (FOV) tracking viewer 312 may be overlaid atop a portion of the microscope viewing window 316, such as in FIG. 3. Alternatively, the FOV tracking viewer 312 may appear in the slide tray viewing window 302 as either a separate viewing window or appearing alongside the whole slide images 306, 308, 310. In the example depicted in FIG. 3, the microscope stage view 312 is illustrated with a graphical representation of a WSI 313, corresponding to the selected slide 306.

In certain embodiments, the FOV tracking viewer 312 may be configured to provide a graphical representation of a physical microscope stage displaying a whole slide image 313. Overlaid on the WSI 313 in the viewer 312 are darkened or shaded semitransparent overlays 314 that represent the portions of the WSI that have been examined by the pathologist. These semitransparent overlays 314 depict both where the user has examined the WSI 306 and, optionally, at what magnification each section of the WSI has been examined. In embodiments, the shading may be darker where the pathologist has spent more time on a particular field of view. In this manner, the shading creates a "heat map" that is indicative of the pathologist's interest or concern with respect to specific portions of a slide image.

One or more icons 320 may be provided on a status bar 321 of the viewer main menu 301. The icons 320 may provide certain functionality, such as an icon indicating the current state of the slide tray viewing window 302, or a control for changing the display of the slide tray viewing window 302. In certain embodiments, the icons 320 may contain a toggle for the FOV tracking viewer 312 as well as FOV tracking controls. These controls may be to toggle a particular overlay, the magnification level of the overlays, the shading or color of the overlays, or to open a customizable settings menu for the FOV tracking viewer 312.

Figure 4:
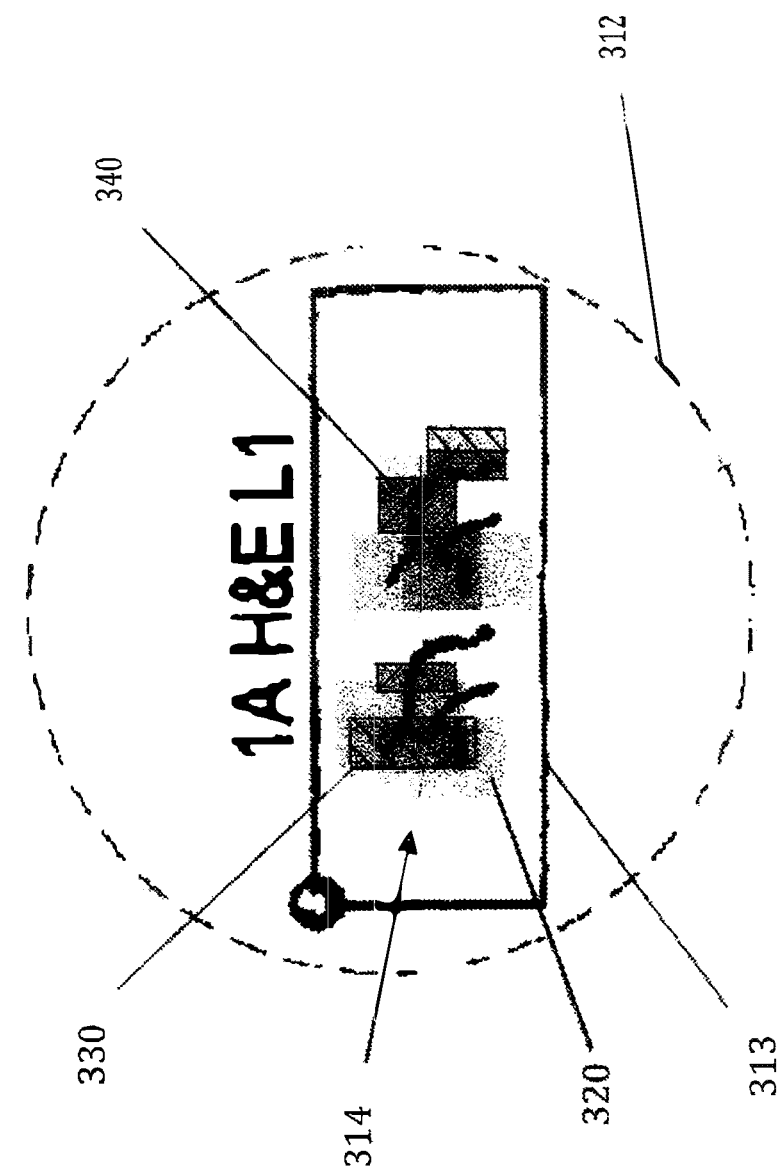
FIG. 4 is a detailed view of the heat map viewer of the present invention.

FIG. 4 depicts a detailed view of the FOV tracking viewer 312. Semitransparent overlays 314, represent locations on a WSI 313 that have been viewed. In this example, individual fields of view along with the corresponding magnification levels were recorded by the system. These recorded fields of view were then converted into the semitransparent overlay shaded areas 314 as seen in FIG. 4. In embodiments, a first magnification is represented by shading 320, a second magnification is represented by left hatching marks 330, and a third magnification is represented by right hatching marks 340. In other embodiments, different magnifications are represented by different colors or different shading darknesses. Upon completion of the pathologist's evaluation, the FOV viewer 312 depicts where the pathologist had an increased level of attention and it also shows the areas where the pathologist did not examine the slide at any magnification level. It is understood that the various semitransparent overlays may also vary by color, texture, hatching, transparency and other mechanisms known to those of skill in the art to represent the different magnification levels recorded.

In certain embodiments, the system may record the fields of view along with the corresponding magnification levels and create a table to be associated with that individual slide. The table may summarize how much of the slide was examined at a given magnification level. In embodiments, the table may set forth the proportion of tissue that has been within the field of view at each magnification level between 4× and 60×. Those of skill in the art will recognize that other data can be displayed that has been measured and recorded by the system. In certain embodiments, the table is displayed as follows:

| Magnification | Proportion of Tissue Viewed |
| --- | --- |
| 4× | 0.3 |
| 10× | 0.1 |
| 40× | 0.05 |
| Not viewed | 0.55 |

As can be seen from the present invention, recording and providing useful data of the fields of view used by the pathologist can be helpful both in the examination process and well as for educational purposes. The system may help the pathologist ensure that all important sections of a specimen are examined. The system may also provide examples of examination methodology. In certain educational embodiments, the digital specimen images examined by the pathologist may be overlaid on the whole slide image one at a time in video format. In this way, it can be used as a training tool so that pathology students and others can watch how more skilled pathologists approach a case to reach a diagnosis.

The invention has been described with respect to a number of objects and aspects, and explained with reference to preferred arrangements, possible alternatives and other examples. However the invention is not limited to the embodiments given as examples.

We claim:

1. A digital pathology system for recording and displaying field of view portions of a whole slide image comprising:
at least one processor;
a memory in operative connection with the at least one processor;
wherein, responsive to execution of program instructions accessible to the at least one processor, the at least one processor is configured to:
receive input regarding the selection of at least two selected digital specimen images to be viewed in a viewing window;
display the at least two selected digital specimen images, the at least two selected digital specimen images comprising portions of the whole slide image scanned at one or more magnifications;
record a field of view data trail for the at least two selected digital specimen images that were displayed;
map the at least two selected digital specimen images to the whole slide image;
display the location of the at least two selected digital specimen images on the whole slide image; and
display an indicator of the proportion of the whole slide image that has been viewed at each of the one or more magnifications.

2. The system of claim 1, wherein the at least two selected digital specimen images are displayed in the viewing window one at a time in the order in which they were selected.

3. The system of claim 1, wherein the at least two selected digital specimen images are stored in the memory.

4. The system of claim 1, wherein the at least two selected digital specimen images mapped onto the whole slide image are displayed in a tracking viewer.

5. The system of claim 4, wherein the tracking viewer partially covers the viewing window.

6. The system of claim 4, wherein all of the at least two selected digital specimen images are displayed in the tracking viewer at the same time.

7. The system of claim 4, wherein all of the at least two selected digital specimen images are displayed back to back in the order they were selected in order to serve as a training tool.

8. The system of claim 1, wherein the location of the at least two selected digital specimen images is displayed using semitransparent shading overlaid on the whole slide image.

9. The system of claim 8, wherein the semitransparent shading varies depending on the magnification used to capture the at least two selected digital specimen images.

10. The system of claim 9, wherein the shading increases with increasing magnification.

11. The system of claim 9, wherein the shading comprises different colors for different magnifications.

12. A method of illustrating the portions of a whole slide image that have been evaluated comprising:
   receiving input about at least two selected digital specimen images, the selected digital specimen images comprising portions of the whole slide image;
   recording a field of view data trail for the at least two selected digital specimen images;
   mapping the at least two selected digital specimen images to the whole slide image;
   displaying a representation of the portions as semitransparent shaded areas overlaid on the whole slide image; and
   displaying an indicator of the proportion of the whole slide image that has been viewed at each of the one or more magnifications.

13. The method of claim 12, wherein the at least two selected digital specimen images comprise portions of the whole slide image scanned at one or more magnifications.

14. The method of claim 13, wherein the shading differs depending on the level of magnification.

15. The method of claim 14, wherein the darkness of the shading increases in correlation with increasing magnification.

16. The method of claim 13, wherein the semitransparent shading comprises colors corresponding to different magnifications.

17. The method of claim 12, wherein the step of mapping further comprises calculating the location and size of the shaded area on the whole slide image.

18. The method of claim 12, wherein the step of displaying the shaded areas is performed sequentially for training purposes.

19. The method of claim 12, further comprising providing a table that summarizes the proportion of tissue that has been viewed at each magnification level.

20. A computer program product comprising:
   a non-transitory computer-readable storage medium having computer readable program code embodied therewith, the computer readable program code comprising:
   computer readable program code configured to display at least two digital specimen images on a display device;
   computer readable program code configured to receive input regarding the at least two selected digital specimen images;
   computer readable program code configured to record a field of view data trail for the at least two selected digital specimen images; and
   computer-readable program code configured to map the at least two selected digital specimen images to a whole slide image, display a representation of the at least two digital specimen images as semitransparent shaded areas overlaid on the whole slide image, and display an indicator of the proportion of the whole slide image that has been viewed at each of the one or more magnifications.

* * * * *